United States Patent Office 3,483,763
Patented Dec. 16, 1969

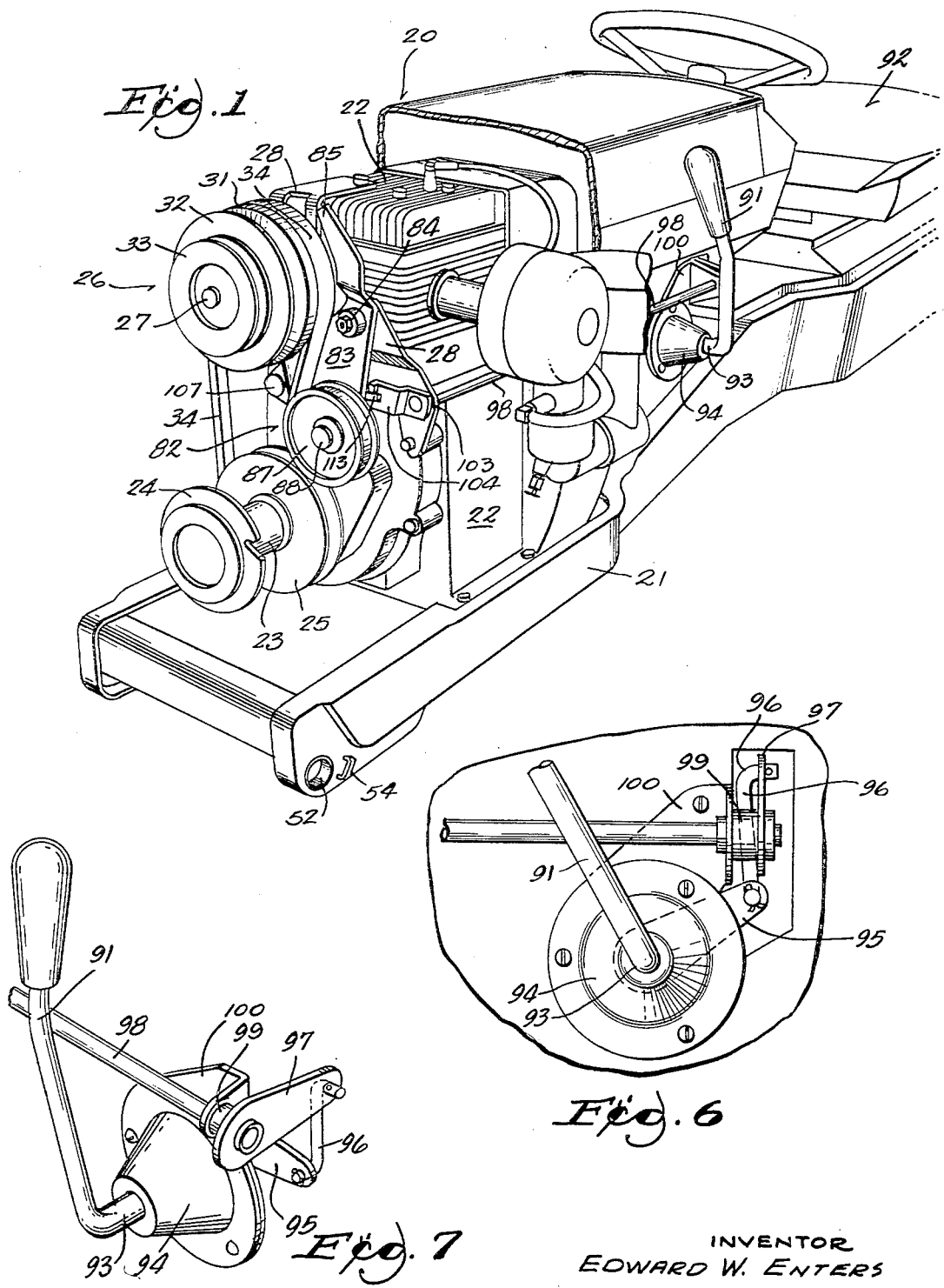

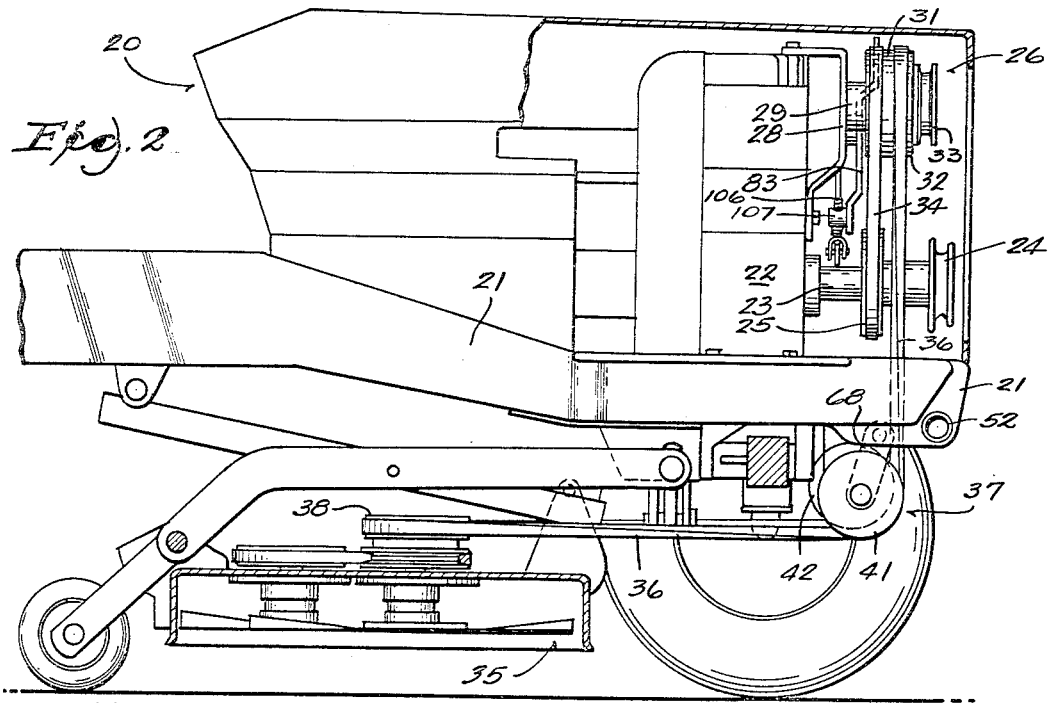
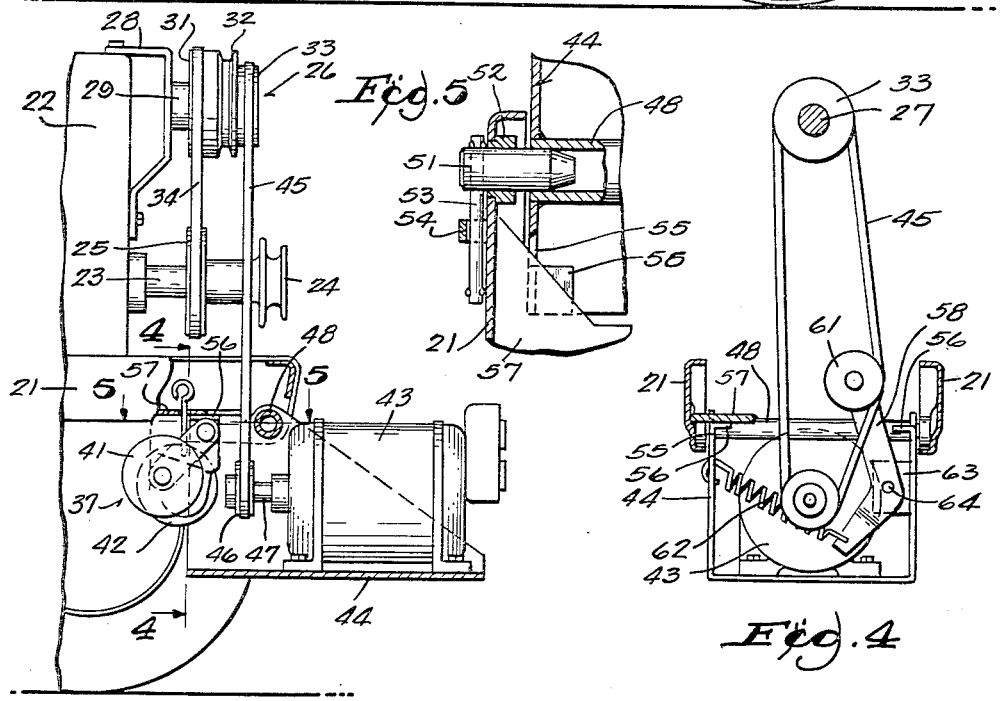

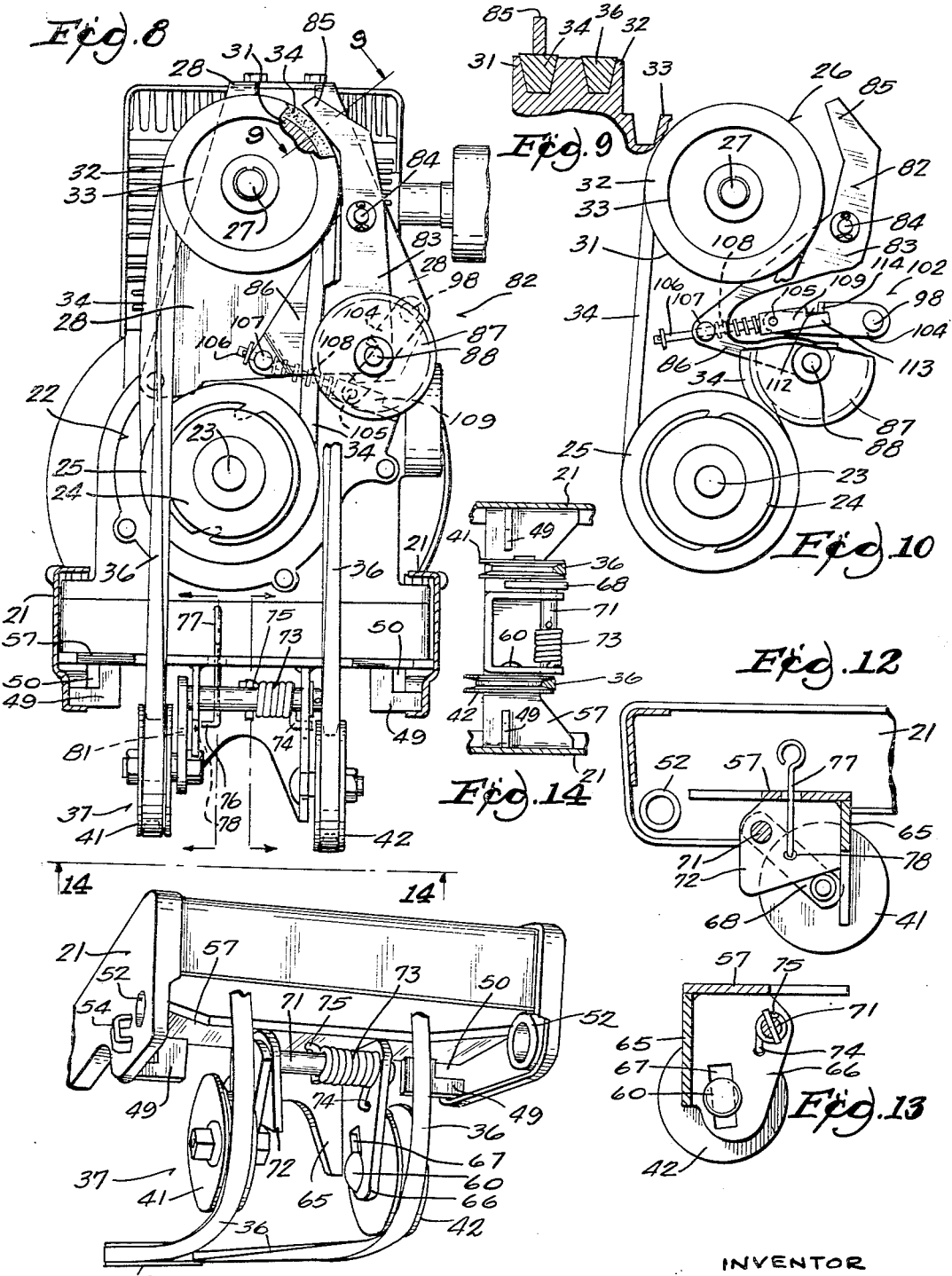

3,483,763
POWER TAKE-OFF FOR TRACTOR ENGINE
Edward W. Enters, Fredonia, Wis., assignor to Gilson Bros. Co., Plymouth, Wis., a corporation of Wisconsin
Filed Dec. 7, 1967, Ser. No. 688,883
Int. Cl. F16h 7/12, 37/00
U.S. Cl. 74—15.63                             13 Claims

ABSTRACT OF THE DISCLOSURE

Power take-off (PTO) mechanism mounted on the front of a tractor engine. The power train from the PTO to an implement is mounted on the tractor and has a brake-clutch mechanism. The PTO provides one convenient, built-in PTO point for front, center or rear mounted attachments.

CROSS REFERENCE TO RELATED APPLICATIONS

Cross reference is made to a copending United States patent application Ser. No. 652,567, filed July 11, 1967, and a copending United States patent application Ser. No. 672,095, filed Oct. 2, 1967.

BACKGROUND OF THE INVENTION

Prior art PTO mechanisms mounted on the front of a tractor engine typically are mounted directly on the engine crankshaft. Control is exercised through a disk clutch. The PTO output belt pulley is near the lower front corner of the tractor. When a mule drive is used to transmit power to an attachment beneath the tractor, there is only a short distance through which the belt extends between the PTO output pulley and the mule drive pulleys. The belt twists in this short distance and is subject to high twisting stresses in the short space between the PTO output pulley and the mule drive pulleys.

SUMMARY OF THE INVENTION

An important advantage of the PTO herein disclosed is the elongation of the path of the PTO output belt between the drive pulley on the PTO shaft and a pulley around which the accessory drive belt is trained in the course of transmitting power to the attachment. In circumstances where the PTO output belt must be twisted in the course of running it to a remote attachment, the extra length of the elongated belt results in distributing the twisting stresses in the belt over a relatively long length. This greatly increases the life of the PTO output belt.

An important feature of the power take-off mechanism of the present invention is the control thereof through a brake-clutch unit which acts upon a relatively short untwisted PTO input belt interconnecting a pulley on the engine power shaft with a pulley on the PTO shaft. All clutching and braking of the power take-off mechanism involves manipulation of the PTO input belt. The brake-clutch unit has an idler pulley which selectively tautens and slackens the PTO input belt for clutching purposes. The brake-clutch unit also has a brake shoe which engages the PTO input belt at the point where it passes around the pulley on the power take-off shaft. An important advantage in this construction is that the brake-clutch unit controls the input to the PTO. Accordingly, the PTO and any attachment connected thereto are concurrently controlled by the brake-clutch unit. This constitutes a substantial improvement over prior art devices in which the control is applied to the PTO output. In such devices the power take-off mechanism continues to operate at all times, regardless of any control exercised by the tractor operator.

The present invention also improves on the mule drive which transmits power from the PTO mechanism around the lower front corner of the tractor frame and to a powered attachment typically mounted beneath the tractor, such as a rotary mower. The mule drive has spaced parallel pulleys. One pulley is adjustable and the other is spring biased to maintain tension on the belt. The spring biased pulley is also provided with a retractable latch to lock the pulley in an out-of-the-way position, for example, during adjustments on the power train.

Other objects, features, and advantages of the invention will appear from the following disclosure.

DETAILED DESCRIPTION OF THE DRAWINGS

FIG. 1 is a perspective view showing a power take-off and control mechanism embodying the invention, as applied to a front engine tractor.

FIG. 2 is a fragmentary side elevation of a tractor embodying the invention and showing the belt connection from the power take-off to a rotary mower implement mounted beneath the tractor. Portions of the tractor engine housing are broken away to expose the PTO.

FIG. 3 is a fragmentary side view showing a different specific implement mounted on the front of the tractor frame and powered by the PTO of the present invention.

FIG. 4 is a fragmentary cross section taken along the line 4—4 of FIG. 3.

FIG. 5 is a fragmentary cross section taken along the line 5—5 of FIG. 3.

FIG. 6 is a fragmentary side view of a mid portion of the tractor showing the PTO control rod and the linkages by which the clutch-brake unit for the PTO is actuated.

FIG. 7 is a perspective view showing the control rod and linkages.

FIG. 8 is a fragmentary front elevation of the tractor engine with power take-off, brake-clutch unit and mule drive mounted thereon. The brake-clutch unit is shown in braking position.

FIG. 9 is a fragmetnary cross section taken along the line 9—9 of FIG. 8.

FIG. 10 is a fragmentary and somewhat schematic view showing the brake-clutch unit in clutching position.

FIG. 11 is a fragmentary persepctive view from beneath the front end of the tractor and showing the mule drive.

FIG. 12 is a fragmentary cross section taken along the line 12—12 of FIG. 8.

FIG. 13 is a fragmentary cross section taken along the line 13—13 of FIG. 8.

FIG. 14 is a view from beneath the tractor substantially as viewed along the line 14—14 of FIG. 8.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure.

The tractor 20 is desirably provided with a combined frame and engine base having side beams 21, as disclosed in the copending United States patent application 672,095 aforesaid. The engine 22 is conventionally provided with an engine power crankshaft 23 which projects forwardly from the engine and may be provided at its front end with a rope starting pulley 24. In accordance with the present invention, the power shaft 23 is provided with a power output pulley 25 which is a component of a PTO mechanism 26 which includes a stationary power take-off shaft 27 mounted a substantial distance above and in spaced parallel relation to the engine power shaft 23. Power take-off shaft 27 is mounted at its inboard end on a bracket 29 secured to a stand-off bracket 28 attached to the front of engine 22.

The stationary power take-off shaft 27 provides a bearing for a freely rotatable pulley array including a power input belt pulley 31 and two power output belt pulleys 32, 33. Power input pulley 31 is radially aligned with the power output pulley 25 on engine power shaft 23. A relatively short, straight or untwisted PTO input V-belt 34 interconnects pulleys 25, 31.

The PTO output belt may be coupled to either of pulleys 32 or 33. Where the driven implement is mounted beneath the tractor frame, for example, a rotary mower 35 as shown in copending United States patent application 652,657 aforesaid, a relatively long PTO power output pulley 32. (FIGS. 2 and 8). This belt is also reeved around the pulleys 41, 42 of a mule drive 37 (FIGS. 8 and 11), and thence around the input pulley 38 of the rotary mower 35, as is shown in FIG. 2 hereof.

The respective drive pulleys 41, 42 of the mule drive 37 are mounted on axes which are transverse to the axis of the power take-off shaft 27. Accordingly, the relatively long PTO output belt 36 is twisted between PTO output pulley 32 and the mule drive pulleys 41, 42, as is clearly shown in FIGS. 2 and 8.

It is an important advantage of the present invention that the power take-off shaft 27 be at the opposite side of the engine power shaft 23 from the mule drive pulleys 41, 42 about which the PTO output belt 36 is reeved. This arrangement or geometry provides a substantial spacing between these pulleys for uniform distribution of the twisting stress in the twsted belt 36 over a substantial belt length. In prior art power take-off structures in which the output pulley of the power take-off is on the axis of the engine power shaft 23, there is a very short distance between such power output pulley and the mule drive pulleys. Accordingly, in such prior art devices, the twisted PTO output belt is relatively short between these pulleys, and the per unit of belt length twisting stress is much higher than in the present invention in which the elongation of the belt reduces per unit of belt length twisting stresses and minimizes belt wear and failure.

FIG. 3 shows the PTO of the present invention powering an attachment at the front of the tractor. In this embodiment a portable electric generator 43 is mounted on a carrier tray 44 at the front of the tractor. The mule drive pulleys 41, 42 are retracted. PTO output belt 45 is reeved about the foremost power output pulley 33 on the power take-off shaft 27 and about a power input or drive pulley 46 on the shaft 47 of the generator 43. In the structure shown in FIG. 3, the pulley 46 rotates on an axis which is in spaced parallel relation to the axis on which the pulley 33 on the power take-off shaft 27 rotates. Accordingly, PTO output belt 45 is not twisted.

The generator carrier shelf 44 is detachably mounted on the front of the tractor 20, as is shown in FIGS. 4 and 5. The frame 21 of the tractor is provided with laterally aligned trunnion pin sockets 52 to telescopically receive trunnion pins 51. The carrier tray 44 is provided with a cross tube 48 into the ends of which the pins 51 extend when the carrier 44 is mounted on the tractor. The pins 51 may be withdrawn axially to detach the carrier tray 44 from the tractor. Pins 51 are desirably provided with laterally extending locking stems or keys 53 which are slideable on their axes and may be received within a keeper eye or loop 54 mounted on the frame beams 21 to lock the pins 51 in engaged position.

The tray 44 is provided with bracket wings 55 having inturned flanges 56 which extend inwardly beyond the axis of cross tube 48 and which are pivotally biased upwardly by the weight of the generator 43 into upward thrust engagement with a cross member 57 which spans across the side members of the frame 21. Corner blocks 49 with socket openings 50 are also provided. These are adapted to receive mounting tangs which are not shown in the disclosed embodiment of the wings 55, but which can be added to the wings, as shown in my copending United States patent application Ser. No. 688,882, filed Dec. 7, 1967.

FIG. 4 shows a tightener for PTO output belt 45 by which power from the power take-off output pulley 33 is controlled. The belt tightener comprises a lever 58 carrying an idler pulley 61 biased by the spring 62 into engagement with the belt 45. Lever 58 is pivotally connected to a bracket 63 mounted on one side wall of the carrier tray 44 on the pintle 64.

The mule drive 37 is best shown in FIGS. 8 and 11 through 14. The pulleys 41, 42 are mounted on a hanger bracket 65 which is welded to the undersurface of tractor frame cross plate 57. Hanger bracket 65 has one leg 66 with a vertically elongated slot 67 within which the axle shaft 60 of pulley 42 is mounted. Slot 67 permits adjustment of the position of the pulley 42 to accommodate for variations in length of the belt 36, one run of which passes around pulley 42.

Pulley 41 is mounted on a swing arm 68 which is pivotally connected on a pin 71 to the opposite leg 72 of the hanger bracket 65. Swing arm 68 is fast to a pivotally mounted cross shaft 71 which spans between the bracket legs 66, 72 and which is encircled by a helical coil spring 73. One end 74 of spring 73 is anchored to the bracket leg 66, and the other end 75 of spring 73 is anchored to the shaft 71. The coil spring 73 biases the arm 68 and pulley 41 toward its foremost position, thus to act as a belt tightener and maintain the belt 36 taut during operation.

In order to provide sufficient slack to permit easy removal of the belt 36, pulley 41 may be swung on its arm 68, against the bias of spring 73, to its retracted position shown in FIG. 12. The arm 68 may be latched in its retracted position by the tang 76 of latch pin 77. Swing arm 68 is provided with a hole 78 which can be swung into alignment with a corresponding hole 81 in the bracket leg 72. Tang 76 is then inserted, as is illustrated in FIG. 8, thus to lock the pulley 41 in its retracted position. This is also illustrated in FIG. 3 where the pulley 41 is latched in retracted position to withdraw it from interference with belt 45.

Accordingly, both pulleys 41, 42 of the mule drive are movable. Pulley 42 is movable along its slot 67 for initial adjustment and to compensate for minor variations in belt length. Pulley 41 is movable under the pressure of spring 73 to keep the belt taut during operation and to retract it to a withdrawn position.

An important feature of the invention is the brake-clutch unit 82, best shown in FIGS. 1 and 8 through 10. This unit 82 comprises a swing lever 83 pivotally mounted on the pintle 84 on the stand-off mounting bracket 28 on which the power take-off shaft 27 is also mounted. The upper end of the lever 83 constitutes a brake shoe 85 which will impose braking pressure directly on the short PTO power input belt 34, as shown in FIGS. 8 and 9. The end of the lever 83 at the other side of pintle 84 constitutes a carrier 86 for idler pulley 87 which is free to rotate on its shaft 88 and which functions as a clutch or belt tightener. Pulley 87 may be swung to bear against the short, straight PTO input belt 34, as shown in FIG. 10.

Lever 83 of brake-clutch unit 82 is actuated and controlled by a control means including a handle 91 conveniently within the reach of an operator in the seat 92 of the tractor. Lever 91 has one end turned to constitute a shaft 93 and has bearing support in a bell housing 94 bolted to the side of the tractor. At its inner end the shaft 93 carries a crank 95 pivotally connected with a link 96 in turn pivotally connected to a crank 97 on the end of a forwardly projecting control and actuating rod or shaft 98. Shaft 98 has a bearing at 99 in support bracket 100.

The forward end of the shaft 98 is rotatable in a bearing opening at 103 in support bracket 28 and is fast to a crank arm 104 which is part of an over-center or toggle joint latching mechanism 102 which is also part of the control means, and by which the lever arm 83 is turned on its support pintle 84. Crank arm 104 is pivotally connected at its outboard end on a pin 105 to a toggle arm 109 which has fixed to its end a rod 106 which is slideable through an opening in a stub post 107 mounted on one corner of the idler carrier 86. A coil spring 108 about rod 106 is interposed between the end of arm 109 and the post 107, to tend to urge the post 107 away from the toggle joint 102. Toggle arm 109 has a notch 112 at its rear end so that when the control lever is swung in one direction to turn control shaft 98 to the position of the parts shown in FIG. 10, toggle arms 104, 109 will come into substantial alignment and will then go slightly over center until a stop 114 on crank 104 is received in notch 112 and finger 113 on arm 109 engages the stop 114 under pressure of the spring 108.

Spring 108 also urges the post 107 and the lever 83 on which it is mounted in a clockwise direction, as shown in FIG. 10, thus to bias the idler pulley 87 against belt 34 and tighten belt 34 against its respective pulleys 25 and 31. In the position of the parts shown in FIG. 10, the PTO is clutched to transmit power from the engine power shaft 23 to the pulley array 31, 32, 33 on the power take-off shaft 27, and thus transmit power to whichever PTO output belt 36 or 45 is in use. When the brake-clutch unit 82 is in clutched position of FIG. 10, brake shoe 85 is withdrawn from contact with PTO power input belt 34.

When control lever 91 is moved in the opposite direction to brake the toggle joint 102 by rotating shaft 98 counterclockwise, as shown in FIG. 8, spring 108 will relax, and lever 83 will swing counterclockwise to withdraw idler pulley 87 from belt 34. This permits belt 34 to become slack, as shown in FIG. 8, thus declutching the PTO 26 from driving connection to the engine power shaft 23. Further movement of the control lever 91 will continue to rotate lever 83 counterclockwise in FIG. 8 to press brake shoe 85 against the belt 34. The belt 34 then functions as a brake lining material, and braking pressure is then imposed on the PTO 26 to stop rotation of the pulley array 31, 32, 33 and also stop the operation of any implement powered by the PTO.

If the operator relaxes pressure on the control lever 91, the brake-clutch mechanism 82 will assume a neutral position in which neither braking pressure nor clutching pressure is applied. If desired, a spring may be added to assist the braking action and maintain braking pressure when the operator releases the control lever 91.

What is claimed is:

1. In a tractor or the like having an engine with a power shaft extending from the engine, an implement mounted on the tractor, a PTO output belt drive to said implement, said belt drive including a drive pulley mounted at one side of said power shaft, a PTO mechanism which receives power from the power shaft and transmits it to the implement through said drive pulley, the improvement in said PTO mechanism comprising:
 a PTO shaft in spaced parallel relation to the power shaft and at its side opposite the said drive pulley,
 a power output pulley on the power shaft,
 power input and output pulleys on said PTO shaft,
 a relatively short PTO input belt directly interconnecting the power output pulley on the power shaft to the power input pulley on the PTO shaft,
 and a relatively long belt interconnecting the PTO output pulley with said drive pulley,
 whereby the input to the PTO mechanism is directly from the power output pulley on the power shaft through a relatively short belt to the power input pulley on the PTO shaft and the output from the PTO mechanism is through a relatively long belt.

2. The invention of claim 1 in which the axis of rotation of said drive pulley is transverse to the axis of rotation of the power output pulley whereby the relatively long belt is twisted therebetween.

3. The invention of claim 2 in which said drive pulley is a component part of a mule drive mounted on the front corner of the tractor, said implement being mounted on the tractor rearwardly of the mule drive.

4. The invention of claim 3 in which the mule drive has another drive pulley, said long belt being reeved about both pulleys, at least one of said mule drive pulleys being movable between an advanced position and a retracted position.

5. The invention of claim 4 in combination with a latch to hold said one mule drive pulley in retracted position.

6. The invention of claim 1 in combination with a brake-clutch unit for the PTO mechanism, said unit comprising an idler pulley for the short belt, a brake shoe for the short belt and control means for selectively
 (a) engaging the idler pulley to the short belt to tighten the belt and clutch the power shaft to the power ouput pulley,
 (b) disengaging the idler pulley from the short belt and declutching the PTO shaft from the power output pulley on the power shaft,
 (c) engaging the brake shoe with the short belt to brake the power output pulley.

7. The invention of claim 6 in which said brake-clutch unit further comprises a swing lever to one end of which the brake shoe is attached and to the other end of which the idler pulley is attached, said brake shoe being proximate the short belt where it passes around the power input pulley on the PTO shaft and said idler pulley being proximate the short belt at a point along its length intermediate the power input pulley on the PTO shaft and the power output pulley on the engine power shaft, said control means comprising means to swing said lever.

8. The invention of claim 7 in which the means to swing said lever comprises a spring-biased, over-center latch to hold the idler pulley in engagement with said short belt.

9. In a tractor or the like having a mule drive including two pulleys about which are reeved substantially parallel runs of a PTO output belt from an engine-driven PTO mechanism to an implement, a hanger bracket having spaced parallel legs on which the pulleys are respectively mounted, one of said legs having a swing arm on which one pulley is swingable between an advanced and a retracted position, a spring biasing said swing arm toward the advanced position of said one pulley, and a latch to hold said one pulley in its retracted position against the bias of the spring.

10. The invention of claim 9 in which the other said leg has a slot along which the other pulley is also adjustable between an advanced and a retracted position.

11. The device of claim 9 in which said swing arm is provided with a rotatable shaft upon which said arm is mounted, said spring comprising a coil spring around said shaft.

12. A brake-clutch unit for use in a PTO mechanism on a tractor or the like and in which said PTO mechanism comprises pulleys spaced on parallel axes and having a normally slack belt interconnecting said pulleys, said brake-clutch unit comprising a swing lever having a brake shoe at one end of the lever proximate the belt where it passes around one of the pulleys, said lever having at its other end an idler pulley proximate the belt at a point along its length intermediate said pulleys, and control means for selectively:
 (a) engaging the idler pulley with the belt to tighten the belt and clutch the shafts together,
 (b) disengaging the idler pulley from the belt to slacken the belt and declutch the shafts,
 (c) engaging the brake shoe with the belt and against the pulley therebeneath to brake the pulley.

13. The unit of claim 12 in which the control means comprises means to swing the lever and including a spring-biased, over-center latch to hold the idler pulley in engagement with the belt.

References Cited

UNITED STATES PATENTS

| | | | |
|---|---|---|---|
| 3,136,170 | 6/1964 | Murray | 74—242.11 |
| 3,226,853 | 1/1966 | Kamlukin | 74—242.15 X |
| 3,311,186 | 3/1967 | Kamlukin | 180—70 |
| 3,319,731 | 5/1967 | Kenkel | 192—11 X |
| 3,339,662 | 9/1967 | Hanson et al. | 192—11 X |
| 3,367,459 | 2/1968 | Rubin | 192—11 |

FOREIGN PATENTS 612,885   1/1961   Canada.

LEONARD H. GERIN, Primary Examiner

U.S. Cl. X.R.

74—227, 242.15; 180—53, 70; 192—11

PO-1050
(5/69)

UNITED STATES PATENT OFFICE
CERTIFICATE OF CORRECTION

Patent No. 3,483,763      Dated December 16, 1969

Inventor(s) Edward W. Enters - Gilson Bros. Co.

It is certified that error appears in the above-identified patent and that said Letters Patent are hereby corrected as shown below:

Column 2, Line 44,    "persepctive" should read --perspective--

Column 3, Line 16,    After "long" INSERT ---PTO output belt 3( is reeved around the ---

Column 3, Line 33,    "twsted" should read ---twisted---

SIGNED AND
SEALED
MAY 12 1970

(SEAL)
Attest:

Edward M. Fletcher, Jr.
Attesting Officer

WILLIAM E. SCHUYLER, JR.
Commissioner of Patents